(12) United States Patent
He et al.

(10) Patent No.: US 11,463,888 B2
(45) Date of Patent: Oct. 4, 2022

(54) METHOD, DEVICE, AND COMPUTER PROGRAM PRODUCT FOR MANAGING A MOBILE TERMINAL

(71) Applicant: EMC IP Holding Company LLC, Hopkinton, MA (US)

(72) Inventors: Bin He, Shanghai (CN); Pengfei Wu, Shanghai (CN); Zhenzhen Lin, Shanghai (CN); Si Chen, Shanghai (CN); Ruixue Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 168 days.

(21) Appl. No.: 16/907,405

(22) Filed: Jun. 22, 2020

(65) Prior Publication Data

US 2021/0377744 A1    Dec. 2, 2021

(30) Foreign Application Priority Data

May 29, 2020   (CN) .......................... 202010479638.3

(51) Int. Cl.
| | |
|---|---|
| *H04W 16/18* | (2009.01) |
| *H04W 24/10* | (2009.01) |
| *H04W 4/029* | (2018.01) |
| *H04B 17/309* | (2015.01) |

(52) U.S. Cl.
CPC .......... *H04W 16/18* (2013.01); *H04B 17/309* (2015.01); *H04W 4/029* (2018.02); *H04W 24/10* (2013.01)

(58) Field of Classification Search
CPC ..... H04W 16/18; H04W 4/029; H04W 24/10; H04B 17/309
See application file for complete search history.

(56) References Cited

U.S. PATENT DOCUMENTS

| | | | | |
|---|---|---|---|---|
| 2003/0146871 A1* | 8/2003 | Karr | ......................... | G01S 5/021 342/465 |
| 2009/0239532 A1* | 9/2009 | Ebata | .................... | H04W 16/20 455/434 |
| 2013/0279326 A1* | 10/2013 | Dunne | .................. | H04L 41/147 370/228 |
| 2019/0364492 A1* | 11/2019 | Azizi | .................. | H04W 68/005 |

OTHER PUBLICATIONS

ETSI Mobile Technologies, "Why Do We Need 5G?" https://www.etsi.org/technologies/5g, Mar. 4, 2020, 6 pages.

* cited by examiner

*Primary Examiner* — Natasha W Cosme
(74) *Attorney, Agent, or Firm* — Ryan, Mason & Lewis, LLP

(57) ABSTRACT

A method, a device, and a computer program product for managing a mobile terminal are provided. In one method, a first position of the mobile terminal at a first time point and a first signal quality of a mobile network signal of the mobile network at the first position are detected, respectively; a signal quality distribution of the mobile network signal in a surrounding area of the first position is acquired; a prediction of a second signal quality of a mobile network signal to be received by the mobile terminal at a second time point is obtained according to the signal quality distribution, the second time point being a future time point after the first time point; and according to the first signal quality and the prediction of the second signal quality, a second service quality to be provided to the mobile terminal at the second time point is determined.

20 Claims, 9 Drawing Sheets

METHOD, DEVICE, AND COMPUTER PROGRAM PRODUCT FOR MANAGING A MOBILE TERMINAL

RELATED APPLICATION(S)

The present application claims priority to Chinese Patent Application No. 202010479638.3, filed May 29, 2020, and entitled "Method, Device, and Computer Program Product for Managing Mobile Terminal," which is incorporated by reference herein in its entirety.

FIELD

Implementations of the present disclosure relate to mobile networks, and more particularly, to a method, a device, and a computer program product for managing a mobile terminal in a mobile network.

BACKGROUND

With the development of mobile network technologies, higher and higher data transmission speeds can now be provided. Users can already acquire multiple types of services through mobile terminals. For example, users can acquire services of video, audio, various kinds of virtual reality, augmented reality, and mixed reality. It will be understood that when a mobile terminal is located at a different position in a mobile network, the quality of a mobile network signal received by the mobile terminal will be different. This will lead to phenomena such as delays and/or freezing of services at the mobile terminal. In this case, how to manage a mobile terminal has become an important area of research.

SUMMARY

Therefore, the present disclosure provides a technical solution of managing a mobile terminal in a mobile network in a more effective manner. It is expected that this technical solution will be compatible with existing mobile networks, and by modifying various configurations of existing mobile networks, this technical solution can manage a mobile terminal in a mobile network in a more effective manner.

According to a first aspect of the present disclosure, a method for managing a mobile terminal in a mobile network is provided. In this method, a first position of the mobile terminal at a first time point and a first signal quality of a mobile network signal of the mobile network at the first position are detected, respectively; a signal quality distribution of the mobile network signal in a surrounding area of the first position is acquired; a prediction of a second signal quality of a mobile network signal to be received by the mobile terminal at a second time point is obtained according to the signal quality distribution, the second time point being a future time point after the first time point; and according to the first signal quality and the prediction of the second signal quality, a second service quality to be provided to the mobile terminal at the second time point is determined.

According to a second aspect of the present disclosure, an electronic device is provided, including: at least one processor; and a memory coupled to the at least one processor and having instructions stored therein, wherein the instructions, when executed by the at least one processor, cause the device to perform actions for managing a mobile terminal in a mobile network. The actions include: detecting a first position of the mobile terminal at a first time point and a first signal quality of a mobile network signal of the mobile network at the first position, respectively; acquiring a signal quality distribution of the mobile network signal in a surrounding area of the first position; obtaining, according to the signal quality distribution, a prediction of a second signal quality of a mobile network signal to be received by the mobile terminal at a second time point, the second time point being a future time point after the first time point; and determining, according to the first signal quality and the prediction of the second signal quality, a second service quality to be provided to the mobile terminal at the second time point.

According to a third aspect of the present disclosure, a computer program product is provided, the computer program product being tangibly stored on a non-transitory computer-readable medium and including machine-executable instructions that are used to implement the method according to the first aspect of the present disclosure.

With implementations of the present disclosure, when a mobile terminal has not reached a second position, a prediction of a signal quality at this position can be predetermined, and then a service quality suitable for the prediction of the signal quality can be selected.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example and not limitation. In the accompanying drawings.

DETAILED DESCRIPTION

Hereinafter, illustrative implementations of the present disclosure will be described in more detail with reference to the accompanying drawings. Although illustrative implementations of the present disclosure are shown in the accompanying drawings, it should be understood that the present disclosure can be implemented in various forms and should not be limited by the implementations set forth herein. Rather, these implementations are provided so that the present disclosure will be more thorough and complete, and the scope of the present disclosure will be fully conveyed to those skilled in the art.

As used herein, the term "include" and variations thereof mean open-ended inclusion, that is, "including but not limited to." Unless specifically stated, the term "or" indicates "and/or." The term "based on" means "based at least in part on." The terms "one example implementation" and "one implementation" mean "at least one example implementation." The term "another implementation" means "at least one further implementation." The terms "first," "second," etc. may refer to different or the same objects. Other explicit and implicit definitions may further be included below.

Figure 1:
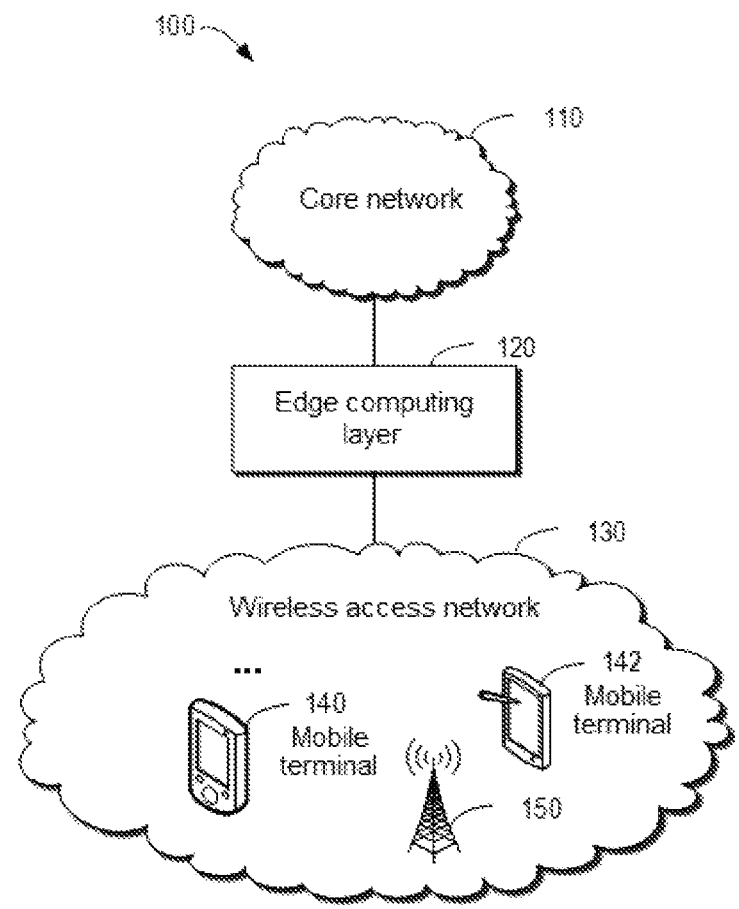
FIG. 1 schematically shows a block diagram of an application environment in which a method according to an example implementation of the present disclosure can be used according to a technical solution.

Firstly, an application environment of an example implementation of the present disclosure will be described with reference to FIG. 1. FIG. 1 schematically shows block diagram 100 of an application environment in which a method according to an example implementation of the present disclosure can be used according to a technical solution. A mobile network may include core network 110 and wireless access network 130. In wireless access network 130, mobile terminals 140, . . . , and 142 can communicate via base station 150. With the development of 5G technologies, an edge computing technology has been proposed at present. Edge computing layer 120 may be provided between core network 110 and wireless access network 130 of the mobile network. Edge computing layer 120 may include an edge computing device. In this way, some computing tasks can be migrated to mobile terminals closer to wireless access network 130.

It will be understood that when mobile terminal 140 is at different positions, the qualities of received mobile signals will be different, which may lead to phenomena such as delays and/or freezing when users are using services from the mobile network. Currently, technical solutions for providing different service qualities to mobile terminal 140 have been proposed. However, the existing technical solutions have a large delay, and the service quality provided to mobile terminal 140 can be adjusted only when it has been found that the signal quality of mobile terminal 140 cannot be adapted to the service quality. Therefore, it is expected that a more effective way can be provided for managing the service quality provided to the mobile terminal.

Figure 2:
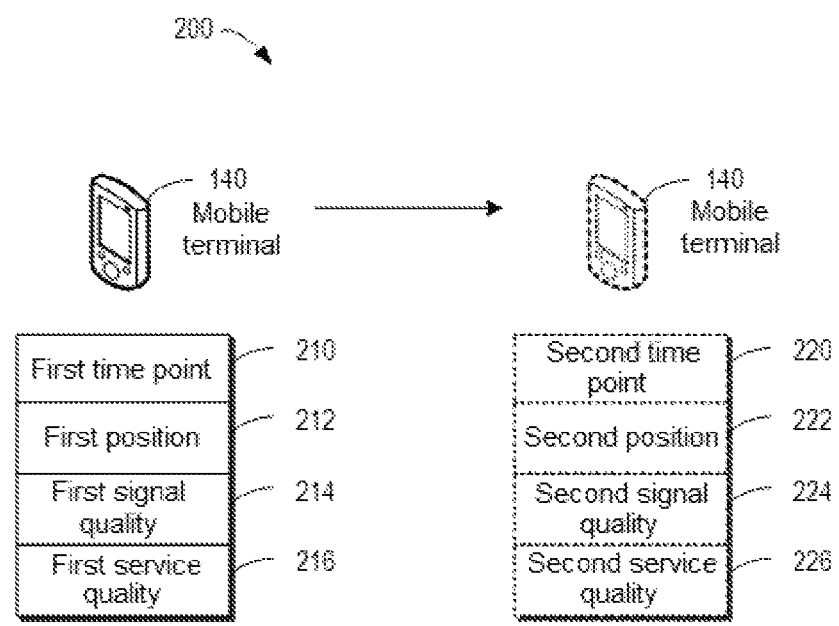
FIG. 2 schematically shows a block diagram of a process for managing a mobile terminal according to an example implementation of the present disclosure.

In order to solve the defects in existing technical solutions, an example implementation of the present disclosure proposes a technical solution for managing a mobile terminal in a mobile network. In this technical solution, a corresponding service quality can be provided based on a signal quality of a position of the mobile terminal. Hereinafter, an overview of an example implementation according to the present disclosure will be described with reference to FIG. 2. FIG. 2 schematically shows block diagram 200 of a process for managing a mobile terminal according to an example implementation of the present disclosure. Mobile terminal 140 may be located at different positions at different time points, and may have different signal qualities. Particularly, mobile terminal 140 may be located at first position 212 at first time point 210. The received mobile network signal may have first signal quality 214, and at this moment, services may be provided to mobile terminal 140 at first service quality 216.

The position of mobile terminal 140 may vary. For example, at second time point 220 after first time point 210, mobile terminal 140 may be located at second position 222. The received mobile network signal may have second signal quality 224, and at this moment, services may be provided to mobile terminal 140 at second service quality 226. It will be understood that second time point 220 here may be a future time point. Based on historical experiences, a prediction of second position 222 and a prediction of second signal quality 224 may be determined. Further, second service quality 226 to be provided to mobile terminal 140 may be determined based on the prediction of second signal quality 224.

With the example implementation of the present disclosure, when mobile terminal 140 has not reached second position 222, a prediction of a signal quality at the position can be predetermined, and in this way, a service quality suitable for the prediction of the signal quality can be preselected for mobile terminal 140. Further, when mobile terminal 140 arrives near second position 222, mobile terminal 140 may be provided with a suitable service quality.

Figure 3:
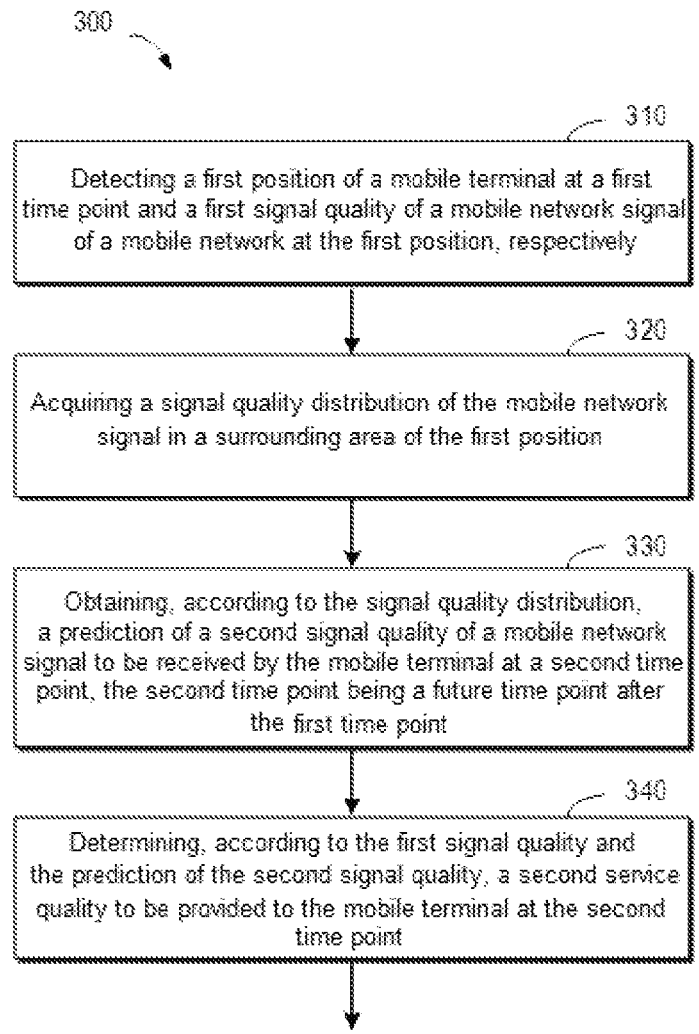
FIG. 3 schematically shows a flowchart of a method for managing a mobile terminal according to an example implementation of the present disclosure.

Hereinafter, more details of an example implementation according to the present disclosure will be described with reference to FIG. 3. FIG. 3 schematically shows a flowchart of method 300 for managing a mobile terminal according to an example implementation of the present disclosure. According to the example implementation of the present disclosure, a mobile network can provide multiple types of services. Particularly, the services may include at least any one of a streaming media service, a virtual reality service, an augmented reality service, and a mixed reality service. Hereinafter, for convenience of description, the example implementation of the present disclosure will be described only with a streaming media service as a specific example of the services. It will be understood that the content of streaming media may have different precisions. For example, high-resolution streaming media may be provided for mobile terminals with good signal quality, and low-resolution streaming media may be provided for mobile terminals with poor signal quality.

At block 310, first position 212 of mobile terminal 140 at first time point 210 and first signal quality 214 of a mobile network signal of a mobile network at first position 212 are detected, respectively. It will be understood that first time point 210 here is the current time point. First position 212 and first signal quality 214 of mobile terminal 140 may be acquired from base stations of the mobile network. Alternatively and/or additionally, first position 212 and first signal quality 214 may be acquired from mobile terminal 140.

At block 320, a signal quality distribution of the mobile network signal in a surrounding area of first position 212 is acquired. It will be understood that the surrounding area here refers to an area around first position 212 and where mobile terminal 140 may reach in the future. According to an example implementation of the present disclosure, the surrounding area may be determined in various ways. An area of a predetermined size around mobile terminal 140 (for example, an area with a side length of 1 km) can be used as the surrounding area; the entire area where mobile terminal 140 is located can be used as the surrounding area; and the surrounding area can be determined based on a moving speed of mobile terminal 140.

According to an example implementation of the present disclosure, the moving speed of mobile terminal 140 may be determined based on a difference in distance between different positions of mobile terminal 140 and a difference in time between time points when the mobile terminal moves to the different positions described above. Then, at least any one of a size and a position of the surrounding area may be determined according to the moving speed of mobile terminal 140. Particularly, the surrounding area may be determined in the direction of the moving speed, and the size of the surrounding area may be proportional to the moving speed.

Figure 4:
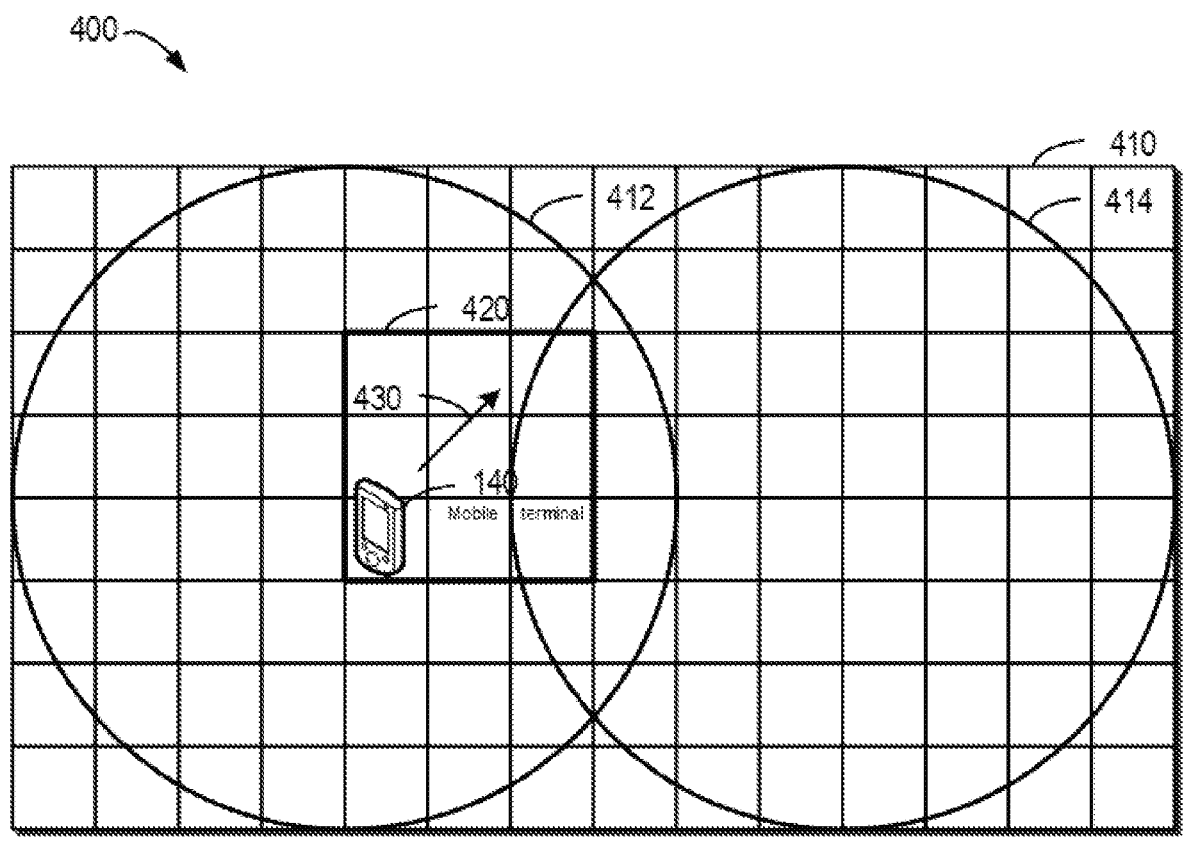
FIG. 4 schematically shows a block diagram of a process for determining a signal quality distribution according to an example implementation of the present disclosure.

FIG. 4 schematically shows block diagram 400 of a process for determining a signal quality distribution according to an example implementation of the present disclosure. According to the example implementation of the present disclosure, area 410 where mobile terminal 140 is located may be divided into multiple grids in advance. Particularly, it can be divided according to a predefined grid size. For example, the grid size can be set to 50 meters and/or other numerical values. According to an example implementation of the present disclosure, the grid size may be adjusted according to a type of a wireless network and/or a coverage range of the base station. For another example, the number of grids can be specified, and the division can be performed according to the specified number. In FIG. 4, area 412 may represent a coverage area of one base station, and area 414 may represent a coverage area of another base station. Mobile terminal 140 may move in a direction indicated by arrow 430. At this moment, the surrounding area can be determined along the direction of arrow 430. Assuming that the moving speed is low, then the surrounding area may include a total of 4 grids, including one grid where mobile terminal 140 is located and the grids above, at the upper right of, and to the right of this grid. Assuming that the moving speed is high, then surrounding area 420 may include 9 grids as shown in FIG. 4.

With the example implementation of the present disclosure, an area where mobile terminal 140 may reach in the future can be determined in a more accurate manner for mobile terminal 140. In this way, the amount of calculation required in the process of determining the signal quality distribution can be reduced. According to an example implementation of the present disclosure, the surrounding area may be determined based on the trajectory of mobile terminal 140. According to an example implementation of the present disclosure, it is also possible to determine a road where mobile terminal 140 is located, and determine the surrounding area based on the direction of the road.

It will be understood that the foregoing only schematically shows a technical solution of pre-dividing grids. Alternatively and/or additionally, surrounding area 420 may be divided into multiple grids after surrounding area 420 is determined, and a corresponding signal quality may be determined for each grid. For one of the multiple grids, a set of signal qualities from a group of mobile terminals in this grid can be received.

A threshold number can be set. If the number of mobile terminals in the grid is higher than this threshold number, only signal qualities from a part of the mobile terminals are collected. According to an example implementation of the present disclosure, the threshold number can be set to 5 (or another numerical value). Assuming that there are 10 mobile terminals in the grid, it is possible to only collect a set of signal qualities from 5 mobile terminals. The signal quality distribution in the grid can be acquired based on the set of signal qualities. For example, an average value of the set of signal qualities can be used as the signal quality distribution in the grid. With the example implementation of the present disclosure, by determining the signal quality distribution based on the signal qualities of multiple mobile terminals located in the grid, it is possible to avoid errors that may be caused when determining the quality distribution based on a signal quality of a certain mobile terminal.

Figure 5:
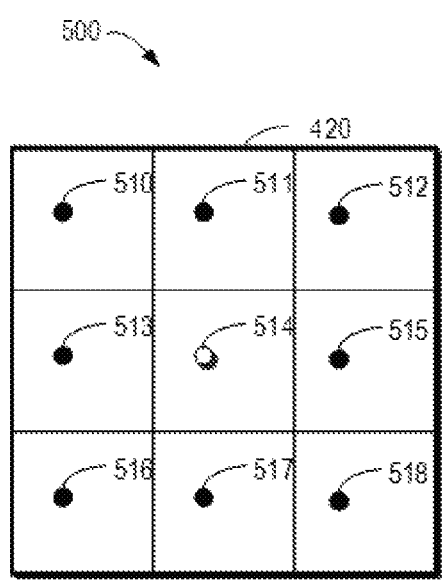
FIG. 5 schematically shows a block diagram of a process for determining a signal quality distribution in a grid according to an example implementation of the present disclosure.

According to the example implementation of the present disclosure, if the number of the set of signal qualities is lower than the predetermined threshold, the signal quality distribution in the grid is determined based on the received set of signal qualities and a signal quality distribution in at least one adjacent grid of the grid. FIG. 5 schematically shows block diagram 500 of a process for determining a signal quality distribution in a grid according to an example implementation of the present disclosure. As shown in FIG. 5, surrounding area 420 may include 9 grids, assuming that signal quality distributions 510, 511, 512, 513, 515, 516, 517, and 518 in 8 of the grids have been determined. Assuming that only signal qualities from 4 mobile terminals in the central grid can be received, then it is necessary to use the signal quality distributions in the adjacent grids to determine signal quality distribution 514 at the central grid.

For example, signal quality distributions 511, 513, 515, and 517 in 4 adjacent grids may be selected, and an average value of the above signal quality distributions may be used as the signal quality of the 5th mobile terminal. Then, the signal quality distribution in this grid may be further determined based on the collected signal qualities of the 4 mobile terminals and the above average value. For another example, it is also possible to use signal quality distributions 510 to 513 and 515 to 518 in 8 adjacent grids. With the example implementation of the present disclosure, in a case where the number of mobile terminals in a certain grid is insufficient, signal qualities in adjacent grids can be used. In this way, a signal quality distribution in a grid can be determined more simply and effectively.

According to an example implementation of the present disclosure, since positions of multiple adjacent grids are different, the distances from the multiple adjacent grids to the grid lacking signal quality data may be different. At this moment, the signal quality distribution in this grid may be determined based on the signal quality distributions in the multiple adjacent grids and the distances from the multiple adjacent grids to this grid. Still referring to FIG. 5, the ratio of distances from the two grids corresponding to signal quality distribution 510 and signal quality distribution 511 to the grid corresponding to signal quality 514 is $\sqrt{2}:1$. At this moment, corresponding weights may also be set for signal quality distributions 510 and 511, and the weights may be inversely proportional to the above distances. With the example implementation of the present disclosure, a distance between two adjacent grids can be considered, and then a signal quality distribution in a grid lacking signal quality data can be determined in a more accurate manner.

Figure 6:
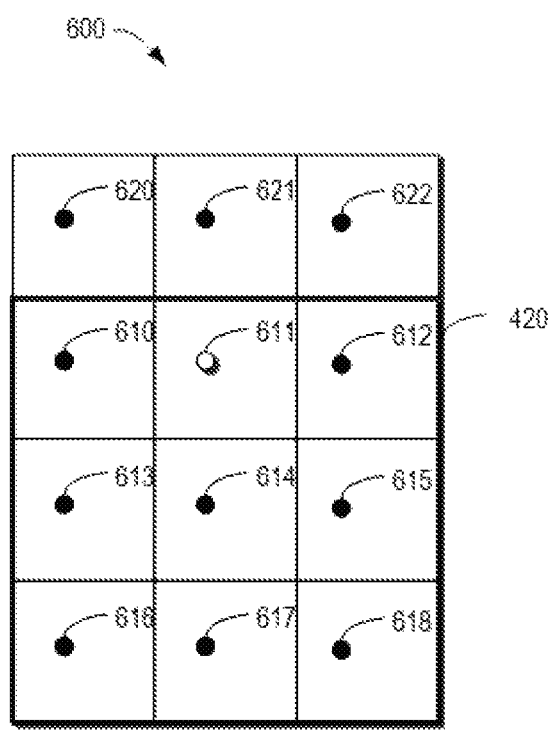
FIG. 6 schematically shows a block diagram of a process for determining a signal quality distribution in another grid according to an example implementation of the present disclosure.

A case where a signal quality distribution in a certain grid is determined based on signal quality distributions in other grids in surrounding area 420 has been described above with reference to FIG. 5. According to an example implementation of the present disclosure, it is also possible to use signal quality distributions in other grids outside surrounding area 420. FIG. 6 schematically shows block diagram 600 of a process for determining a signal quality distribution in another grid according to an example implementation of the present disclosure. Surrounding area 420 includes 9 grids, and signal quality distributions 610 and 612 to 618 in 8 of the grids have been determined based on received signal qualities from the mobile terminals in the grids. Assuming that the grid at the edge of surrounding area 420 lacks signal quality data, then signal quality distribution 611 in this grid can be determined based on signal quality distributions 610, 612, 613, 614, and 615 in grids inside surrounding area 420 as well as signal quality distributions 620, 621, and 622 in grids outside surrounding area 420.

According to an example implementation of the present disclosure, data required during the execution of method 300 may be acquired based on application programming interfaces (APIs) provided by Multi-access Edge Computing (MEC). For example, one API of the MEC can provide information about a position of a mobile terminal, another API can provide identification information about the mobile terminal, and another API can provide a signal quality of the mobile terminal (e.g., the Received Signal Strength Indication (RSSI)). It will be understood that the above APIs only schematically show certain functions provided by the MEC. In a specific application environment, various functions provided by the MEC may be combined to collect various types of data required by method 300.

Figure 7:
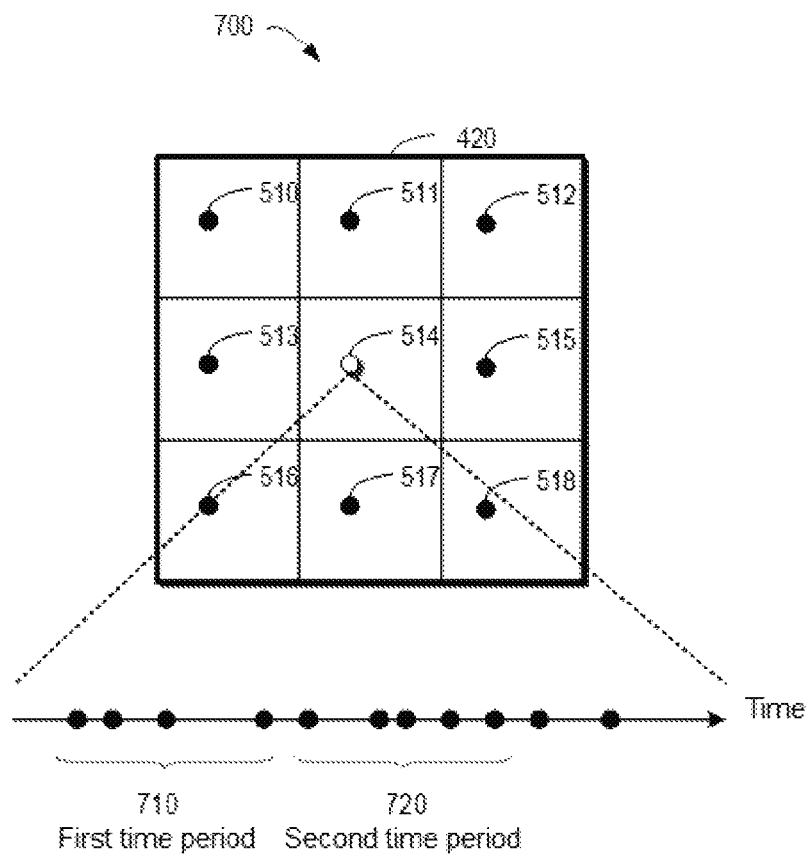
FIG. 7 schematically shows a block diagram of a process for determining a signal quality distribution in different time periods according to an example implementation of the present disclosure.

According to an example implementation of the present disclosure, a validity period can be set for the signal quality distribution, and a set of signal qualities can be received at predetermined time intervals. For example, the signal quality can be collected every 15 minutes, and a corresponding signal quality distribution can be determined for each grid. Hereinafter, more details will be described with reference to FIG. 7. FIG. 7 schematically shows block diagram 700 of a process for determining a signal quality distribution in different time periods according to an example implementation of the present disclosure. As shown in FIG. 7, during first time period 710, assuming that only signal qualities from 4 mobile terminals in a central grid can be received, then it is necessary to determine a signal quality distribution in this grid based on the received signal qualities of the 4 mobile terminals and the signal quality distributions in the adjacent grids. During second time period 720, it is assumed that signal qualities from 5 mobile terminals in the central grid can be received. At this moment, the signal quality distribution in this grid may be determined based on the newly received signal qualities of the 5 mobile terminals.

With the example implementation of the present disclosure, the latest signal quality data can be collected at predetermined time intervals, and then the signal quality distribution in each grid can be determined with the latest collected signal quality data. In this way, the signal quality distribution in each grid can be continuously updated to provide a more accurate basis for subsequent signal quality prediction with the latest data.

How to determine the signal quality distribution in surrounding area 420 has been described above with reference to FIGS. 4 to 7. Hereinafter, the description will return to FIG. 3 to describe how to determine the prediction of second signal quality 224. At block 330, according to the signal quality distribution, a prediction of second signal quality 224 of a mobile network signal to be received by mobile terminal 140 at second time point 220 is obtained, second time point 220 being a future time point after first time point 210.

According to an example implementation of the present disclosure, a prediction of second position 222 of the mobile terminal at second time point 220 can be determined based on first position 212 and a moving speed of mobile terminal 140. The distance and direction in which mobile terminal 140 is to move may be determined based on a difference in time between second time point 220 and first time point 210 and the moving speed of mobile terminal 140. Furthermore, second position 222 of mobile terminal 140 may be determined based on first position 212 and the distance and direction. According to an example implementation of the present disclosure, second position 222 may be determined based on information about a road where mobile terminal 140 is located. With the example implementation of the present disclosure, second position 222 of mobile terminal 140 can be determined in a simple and accurate manner.

According to an example implementation of the present disclosure, a prediction of a position of mobile terminal 140 at a future time point can be determined using various path prediction methods currently known and/or to be developed in the future. For example, it can be implemented based on Kalman filtering algorithms and/or other algorithms.

Furthermore, the prediction of second signal quality 224 may be determined based on the prediction of second position 222 and a signal quality distribution. According to an example implementation of the present disclosure, a grid where second position 222 is located may be determined, and a signal quality distribution in this grid may be used as a prediction of second signal quality 224. With the example implementation of the present disclosure, complex mathematical calculations are not required, and a prediction of a signal quality to be received by mobile terminal 140 at second time point 220 in the future can be easily determined only based on the signal quality distribution in the grid where second position 222 is located.

Still referring to FIG. 3, at block 340, second service quality 226 to be provided to mobile terminal 140 at second time point 220 is determined according to first signal quality 214 and the prediction of second signal quality 224. Second service quality 226 to be provided may be determined based on a comparison between first signal quality 214 and the prediction of second signal quality 224. Particularly, if the prediction of second signal quality 224 is lower than first signal quality 214, second service quality 226 may be set to be lower than first service quality 216 provided to mobile terminal 140 at first time point 210.

It will be understood that the prediction of second signal quality 224 being lower than first signal quality 214 means that the signal quality of mobile terminal 140 is degraded. If service data continues to be provided to mobile terminal 140 with high precision, the poor signal quality is likely not able to support the transmission of high-precision service data to mobile terminal 140. It is assumed that mobile terminal 140 is playing a high-precision video, and the signal quality of mobile terminal 140 is degraded. At this moment, if the high-precision video continues to be provided to mobile terminal 140, the video play will be delayed or frozen. In order to ensure smooth video play, mobile terminal 140 may be provided with a medium-resolution (or low-resolution) video.

With the example implementation of the present disclosure, although the service quality (i.e., video precision) is decreased, it is still possible to guarantee that users can continue to watch the video at this moment. Compared with severe delays and freezing caused by continuing to play the high-precision video, reducing the precision can ensure that the video is played smoothly within the user's acceptable range, thereby improving the user experience.

Similarly, if the prediction of second signal quality 224 is higher than first signal quality 214, second service quality 226 is set to be higher than first service quality 216 provided to mobile terminal 140 at first time point 210. It will be understood that the prediction of second signal quality 224 being higher than first signal quality 214 means that the signal quality of mobile terminal 140 is improved. At this moment, the mobile network can transmit more data, so that the resolution of the video can be improved. With the example implementation of the present disclosure, the service quality provided to mobile terminal 140 can be continuously adjusted in advance based on a prediction of a signal quality of mobile terminal 140 in the future. In this way, pre-scheduling can be provided in a more timely and accurate manner, thereby avoiding the situation of readjusting the service quality after the user experience has deteriorated.

It will be understood that a video streaming service is taken only as an example above to describe how to adjust the service quality. According to an example implementation of the present disclosure, other types of services can be provided to mobile terminal 140. For example, mobile terminal 140 may be provided with a rendering service based on a virtual reality technology. Assuming that a user is using a three-dimensional scene game service, when the signal quality of mobile terminal 140 is degraded, if the content in the three-dimensional scene continues to be rendered with high precision, it will cause a delay in the game service. At this moment, the rendering precision can be reduced. For example, the number of patches in the three-dimensional scene can be reduced, and special lighting effects, material effects, etc. can be turned off. When the prediction of the signal quality of mobile terminal 140 increases, it is possible to increase the number of patches and turn on various effects.

With the example implementation of the present disclosure, the service quality can be adjusted accordingly according to the signal quality requirements of different service types. In this way, a corresponding service quality can be provided according to a prediction of a future signal quality of the mobile terminal in advance.

Figure 8:
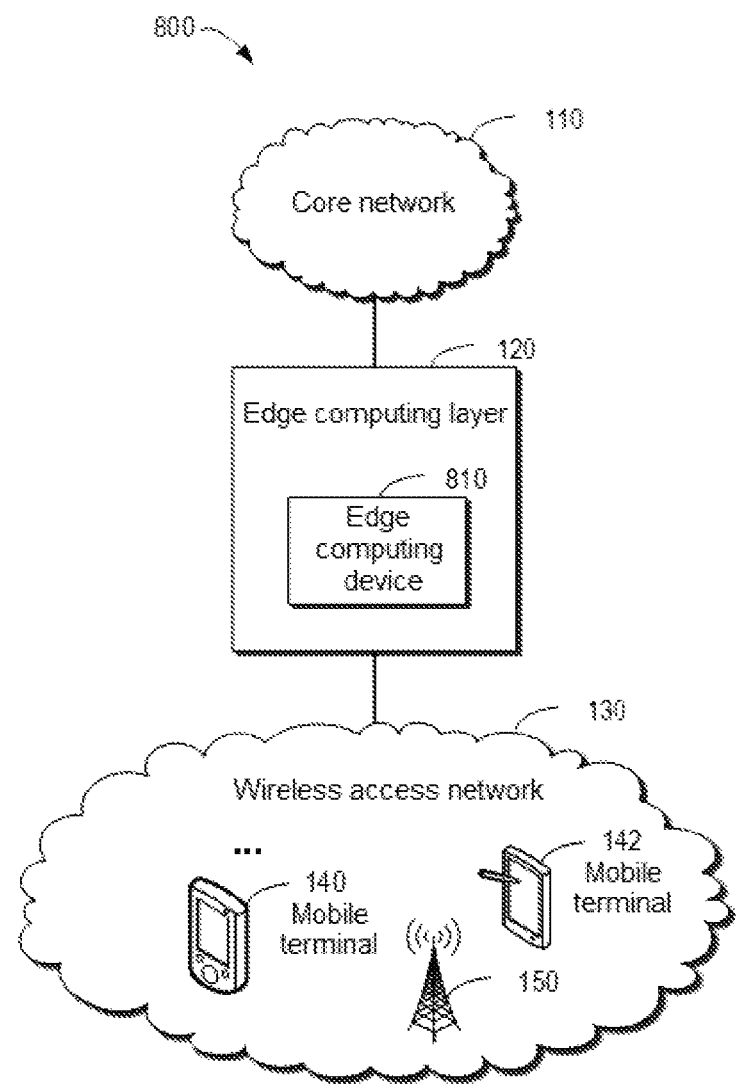
FIG. 8 schematically shows a block diagram of a position of an edge computing device for managing a mobile terminal according to an example implementation of the present disclosure.

The specific steps of the technical solution for managing a mobile terminal have been described above. According to an example implementation of the present disclosure, method 300 described above may be implemented at an edge computing device. Here, the edge computing device is connected between the core network and the wireless access network of the mobile network. Hereinafter, the position of the edge computing device is described with reference to FIG. 8. FIG. 8 schematically shows block diagram 800 of a position of an edge computing device for managing a mobile terminal according to an example implementation of the present disclosure. As shown in FIG. 8, edge computing device 810 may be deployed in edge computing layer 120. In this way, method 300 described above can be implemented at a position as close as possible to mobile terminal 140. The computing tasks that would otherwise need to be performed in core network 110 may be moved to edge computing device 810 for execution. In this way, performing method 300 at edge computing device 810 can optimize the edge computing capability, thereby helping to schedule resource scheduling and power allocation on the network side.

With the example implementation of the present disclosure, the distance from mobile terminal 140 to the device for performing method 300 can be reduced. In this way, on the one hand, the demand for data transmission bandwidth can be reduced, and on the other hand, the received data from various mobile terminals can be responded to at a higher speed. Compared with the technical solutions in the prior art that provide remedial measures after service delays have occurred, the example implementations of the present disclosure can improve the efficiency of managing mobile terminals and reduce delays in management.

Examples of the method according to the present disclosure have been described in detail above with reference to FIGS. 2 to 8, and implementations of the corresponding apparatus will be described below. Particularly, an apparatus for managing a mobile terminal in a mobile network is provided. This apparatus includes: a detecting module configured to detect a first position of the mobile terminal at a first time point and a first signal quality of a mobile network signal of the mobile network at the first position, respectively; an acquiring module configured to acquire a signal quality distribution of the mobile network signal in a surrounding area of the first position; a predicting module configured to obtain, according to the signal quality distribution, a prediction of a second signal quality of a mobile network signal to be received by the mobile terminal at a second time point, the second time point being a future time point after the first time point; and a determining module configured to determine, according to the first signal quality and the prediction of the second signal quality, a second service quality to be provided to the mobile terminal at the second time point. According to the example implementation of the present disclosure, the apparatus mentioned above further includes modules configured to perform other steps in method 300.

Figure 9:
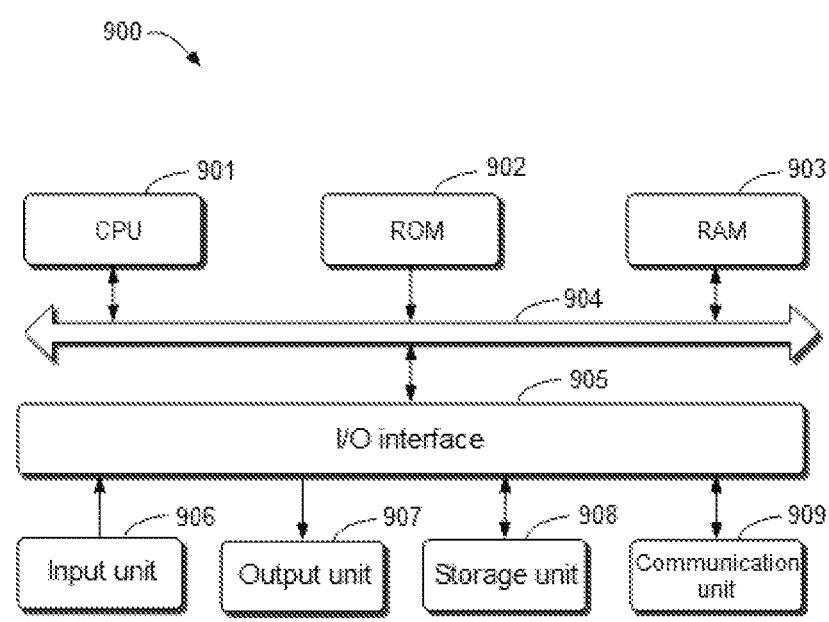
FIG. 9 schematically shows a block diagram of a device for managing a mobile terminal according to an example implementation of the present disclosure.

FIG. 9 schematically illustrates a block diagram of device 900 for managing a backup device according to an example implementation of the present disclosure. As shown, device 900 includes central processing unit (CPU) 901 which can perform various appropriate actions and processing according to computer program instructions stored in read only memory (ROM) 902 or computer program instructions loaded from storage unit 908 into random access memory (RAM) 903. In RAM 903, various programs and data required for the operation of device 900 can also be stored. CPU 901, ROM 902, and RAM 903 are connected to each other through bus 904. Input/Output (I/O) interface 905 is also connected to bus 904.

Multiple components in device 900 are connected to I/O interface 905, including: input unit 906, such as a keyboard or a mouse; output unit 907, such as various types of displays or speakers; storage unit 908, such as a magnetic disk or an optical disk; and communication unit 909, such as a network card, a modem, or a wireless communication transceiver. Communication unit 909 allows device 900 to exchange information/data with other devices over a computer network such as the Internet and/or various telecommunication networks.

The various processes and processing described above, for example, method 300, can be performed by processing unit 901. For example, in some implementations, the methods mentioned above may be implemented as a computer software program that is tangibly embodied on a machine-readable medium, for example, storage unit 908. In some implementations, some or all of the computer program may be loaded and/or installed onto device 900 via ROM 902 and/or communication unit 909. When the computer program is loaded into RAM 903 and executed by CPU 901, one or more steps of the methods described above may be performed. Alternatively, in other implementations, CPU 901 may also be configured in any other suitable manner to implement the above processes/methods.

According to an example implementation of the present disclosure, an electronic device is provided, including: at least one processor; and a memory coupled to the at least one processor and having instructions stored therein, wherein the instructions, when executed by the at least one processor, cause the device to perform actions for managing a mobile terminal in a mobile network. The actions include: detecting a first position of the mobile terminal at a first time point and a first signal quality of a mobile network signal of the mobile network at the first position, respectively; acquiring a signal quality distribution of the mobile network signal in a surrounding area of the first position; obtaining, according to the signal quality distribution, a prediction of a second signal quality of a mobile network signal to be received by the mobile terminal at a second time point, the second time point being a future time point after the first time point; and determining, according to the first signal quality and the prediction of the second signal quality, a second service quality to be provided to the mobile terminal at the second time point.

According to an example implementation of the present disclosure, acquiring the signal quality distribution includes: dividing an area where the mobile terminal is located into multiple grids; and for one of the multiple grids which is located in the surrounding area, receiving a set of signal qualities from a group of mobile terminals in the grid, and acquiring a signal quality distribution in the grid based on the set of signal qualities.

According to an example implementation of the present disclosure, acquiring the signal quality distribution in the grid based on the set of signal qualities further includes: determining, according to a determination that the number of the set of signal qualities is lower than a predetermined threshold, the signal quality distribution in the grid based on the set of signal qualities and a signal quality distribution in at least one adjacent grid of the grid.

According to an example implementation of the present disclosure, determining the signal quality distribution in the grid further includes: determining the signal quality distribution in the grid based on the signal quality distribution in the at least one adjacent grid and the distance from the at least one adjacent grid to the grid.

According to an example implementation of the present disclosure, the actions further include: determining at least any one of a size and a position of the surrounding area according to a moving speed of the mobile terminal.

According to an example implementation of the present disclosure, receiving the set of signal qualities includes: receiving the set of signal qualities at predetermined time intervals.

According to an example implementation of the present disclosure, determining the prediction of the second signal quality includes: determining a prediction of a second position of the mobile terminal at the second time point based on the first position and the moving speed of the mobile terminal; and determining the prediction of the second signal quality based on the prediction of the second position and the signal quality distribution.

According to an example implementation of the present disclosure, determining the second signal quality includes: according to the first signal quality being higher than the prediction of the second signal quality, setting the second service quality to be lower than a first service quality provided to the mobile terminal at the first time point; and according to the first signal quality being lower than the prediction of the second signal quality, setting the second service quality to be higher than the first service quality provided to the mobile terminal at the first time point.

According to an example implementation of the present disclosure, the second service quality includes the precision of at least any one of the following services: a streaming media service, a virtual reality service, an augmented reality service, and a mixed reality service.

According to an example implementation of the present disclosure, this device is implemented at an edge computing device, wherein the edge computing device is connected between the core network and the wireless access network of the mobile network.

According to an example implementation of the present disclosure, a computer program product is provided, the computer program product being tangibly stored on a non-transitory computer-readable medium and including machine-executable instructions that are used to implement the method according to the present disclosure.

According to an example implementation of the present disclosure, a computer-readable medium is provided, wherein the computer-readable medium stores machine-executable instructions that, when executed by at least one processor, cause the at least one processor to implement the methods according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a physical device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, RAM, ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used herein is not construed as transient signals themselves, such as radio waves or other freely propagating electromagnetic waves, electromagnetic waves propagating through waveguides or other transmission media (e.g., optical pulses through fiber-optic cables), or electrical signals transmitted through electrical wires.

The computer-readable program instructions described here may be downloaded from the computer-readable storage medium to various computing/processing devices or downloaded to external computers or external storage devices over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the "C" language or similar programming languages. The computer-readable program instructions can be completely executed on a user's computer, partially executed on a user's computer, executed as a separate software package, partially executed on a user's computer and partially executed on a remote computer, or completely executed on a remote computer or a server. In cases where a remote computer is involved, the remote computer can be connected to a user's computer over any kind of networks, including a local area network (LAN) or a wide area network (WAN), or can be connected to an external computer (e.g., over the Internet by using an Internet service provider). In some implementations, an electronic circuit, for example, a programmable logic circuit, a field programmable gate array (FPGA), or a programmable logic array (PLA), is personalized by utilizing state information of computer-readable program instructions, and the electronic circuit may execute the computer-readable program instructions so as to implement various aspects of the present disclosure.

Various aspects of the present disclosure are described herein with reference to flowcharts and/or block diagrams of the method, the apparatus (system), and the computer program product according to implementations of the present disclosure. It should be understood that each block of the flowcharts and/or block diagrams and combinations of blocks in the flowcharts and/or block diagrams can be implemented by computer-readable program instructions.

These computer-readable program instructions can be provided to a processing unit of a general-purpose computer, a special-purpose computer, or another programmable data processing apparatus, thereby producing a machine, such that these instructions, when executed by the processing unit of the computer or another programmable data processing apparatus, produce a means for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner, such that the computer-readable medium having instructions stored includes an article of manufacture that includes instructions for implementing various aspects of the functions/actions specified in one or more blocks in the flowcharts and/or block diagrams.

The computer-readable program instructions can also be loaded onto a computer, another programmable data processing apparatus, or another device, so that a series of operating steps can be performed on the computer, another programmable data processing apparatus, or another device to produce a computer-implemented process. Therefore, the instructions executed on the computer, another programmable data processing apparatus, or another device implement the functions/actions specified in one or more blocks in the flowcharts and/or block diagrams.

The flowcharts and block diagrams in the accompanying drawings illustrate the architectures, functions, and operations of possible implementations of systems, methods, and computer program products according to multiple implementations of the present disclosure. In this regard, each block in the flowcharts or block diagrams may represent a module, a program segment, or a part of an instruction that contains one or more executable instructions for implementing specified logical functions. In some alternative implementations, functions labeled in the blocks may also occur in an order different from that labeled in the accompanying drawings. For example, two successive blocks may actually be performed basically in parallel, or they may be performed in an opposite order sometimes, depending on the functions involved. It should also be noted that each block in the block diagrams and/or flowcharts and a combination of blocks in the block diagrams and/or flowcharts can be implemented using a dedicated hardware-based system for executing specified functions or actions, or can be implemented using a combination of dedicated hardware and computer instructions.

Various implementations of the present disclosure have been described above. The above description is illustrative but not exhaustive, and is not limited to the various implementations disclosed. Multiple modifications and variations will be apparent to those of ordinary skill in the art without departing from the scope and spirit of the illustrated various implementations. The selection of terms as used herein is intended to best explain the principles and practical applications of the various implementations or the improvements to technologies on the market, and to otherwise enable persons of ordinary skill in the art to understand the implementations disclosed herein.

What is claimed is:

1. A method for managing a mobile terminal in a mobile network, including:
    detecting a first position of the mobile terminal at a first time point and a first signal quality of a mobile network signal of the mobile network at the first position, respectively, wherein a first service quality is provided to the mobile terminal at the first time point;
    acquiring a signal quality distribution of the mobile network signal in a surrounding area of the first position;
    obtaining, according to the signal quality distribution, a prediction of a second signal quality of a mobile network signal to be received by the mobile terminal at a second time point, the second time point being a future time point after the first lime point; and
    determining, according to a comparison of the first signal quality and the prediction of the second signal quality, a second service quality to be provided to the mobile terminal at the second time point;
    wherein, based on a result of the comparison of the first signal quality and the prediction of the second signal quality, the second service quality is set relative to the first service quality, provided to the mobile terminal at the first time point; and
    wherein setting the second service quality includes:
    according to the first signal quality being higher than the prediction of the second signal quality, setting the second service quality to be lower than the first service quality provided to the mobile terminal at the first time point.

2. The method according to claim 1, wherein acquiring the signal quality distribution includes:
    dividing an area where the mobile terminal is located into multiple grids;
    for one of the multiple grids which is located in the surrounding area,
    receiving a set of signal qualities from a group of mobile terminals in the grid; and
    acquiring a signal quality distribution in the grid based on the set of signal qualities.

3. The method according to claim 2, wherein acquiring a signal quality distribution in the grid based on the set of signal qualities further includes: determining, according to a determination that the number of the set of signal qualities is lower than a predetermined threshold, the signal quality distribution in the grid based on the set of signal qualities and a signal quality distribution in at least one adjacent grid of the grid.

4. The method according to claim 3, Wherein determining the signal quality distribution in the grid further includes:
determining the signal quality distribution in the grid based on the signal quality distribution in the at least one adjacent grid and a distance from the at least one adjacent grid to the grid.

5. The method according to claim 2, wherein receiving the set of signal qualities includes: receiving the set of signal qualities at predetermined time intervals.

6. The method according to claim 1, further including: determining at least any one of a size and a position of the surrounding area according to a moving speed of the mobile terminal.

7. The method according to claim 1, wherein determining the prediction of the second signal quality includes:
determining a prediction of a second position of the mobile terminal at the second time point based on the first position and a moving speed of the mobile terminal; and
determining the prediction of the second signal quality based on the prediction of the second position and the signal quality distribution.

8. The method according to claim 1, wherein setting the second service quality further includes:
according to the first signal quality being lower than the prediction of the second signal quality, setting the second service quality to be higher than the first service quality provided to the mobile terminal at the first time point.

9. The method according to claim 1, wherein the second service quality includes the precision of at least any one of the following services: a streaming media service, virtual reality, augmented reality, and mixed reality.

10. The method according to claim 1, wherein the method is implemented at an edge computing device that is connected between a core network and a wireless access network of the mobile network.

11. An electronic device, including:
at least one processor; and
a memory coupled to the at least one processor and having instructions stored therein, wherein the instructions, when executed by the at least one processor, cause the electronic device to perform actions for managing a mobile terminal in a mobile network, the actions including:
detecting a first position of the mobile terminal at a first time point and a first signal quality of a mobile network signal of the mobile network at the first position, respectively, wherein a first service quality is provided to the mobile terminal at the first time point;
acquiring a signal quality distribution of the mobile network signal in a surrounding area of the first position;
obtaining, according to the signal quality distribution, a prediction of a second signal quality of a mobile network signal to be received by the mobile terminal at a second time point, the second time point being a future time point after the first time point; and
determining, according to a comparison of the first signal quality and the prediction of the second signal quality, a second service quality to be provided to the mobile terminal at the second time point;
wherein, based on a result of the comparison of the first signal quality and the prediction of the second signal quality, the second service quality is set relative to the first service quality provided to the mobile terminal at the first time point; and
wherein setting the second service quality includes:
according to the first signal quality being higher than the prediction of the second signal quality, setting the second service quality to be lower than the first service quality provided to the mobile terminal at the first time point.

12. The electronic device according to claim 11, wherein acquiring the signal quality distribution includes:
dividing an area where the mobile terminal is located into multiple grids;
for one of the multiple grids which is located in the surrounding area,
receiving a set of signal qualities from a group of mobile terminals in the grid; and
acquiring a signal quality distribution in the grid based on the set of signal qualities.

13. The electronic device according to claim 12, wherein acquiring the signal quality distribution in the grid based on the set of signal qualities further includes: determining, according to a determination that the number of the set of signal qualities is lower than a predetermined threshold, the signal quality distribution in the grid based on the set of signal qualities and a signal quality distribution in at least one adjacent grid of the grid.

14. The electronic device according to claim 13, wherein determining the signal quality distribution in the grid further includes:
determining the signal quality distribution in the grid based on the signal quality distribution in the at least one adjacent grid and a distance from the at least one adjacent grid to the grid.

15. The electronic device according to claim 12, wherein receiving the set of signal qualities includes: receiving the set of signal qualities at predetermined time intervals.

16. The electronic device according to claim 11, further including: determining at least any one of a size and a position of the surrounding area according to a moving speed of the mobile terminal.

17. The electronic device according to claim 11, wherein determining the prediction of the second signal quality includes:
determining a prediction of a second position of the mobile terminal at the second time point based on the first position and a moving speed of the mobile terminal; and
determining the prediction of the second signal quality based on the prediction of the second position and the signal quality distribution.

18. The electronic device according to claim 11, wherein setting the second service quality further includes:
according to the first signal quality being lower than the prediction of the second signal quality, setting the second service quality to be higher than the first service quality provided to the mobile terminal at the first time point.

19. The electronic device according to claim 11, wherein the second service quality includes the precision of at least any one of the following services: a streaming media service, a virtual reality service, an augmented reality service, and a mixed reality service.

20. A computer program product tangibly stored on a non-transitory computer-readable medium and including machine-executable instructions, wherein the machine-executable instructions when executed cause an electronic device to perform a method for managing a mobile terminal in a mobile network, the method including:
- detecting a first position of the mobile terminal at a first time point and a first signal quality of a mobile network signal of the mobile network at the first position, respectively, wherein a first service quality is provided to the mobile terminal at the first time point;
- acquiring a signal quality distribution of the mobile network signal in a surrounding area of the first position;
- obtaining, according to the signal quality distribution, a prediction of a second signal quality of a mobile network signal to be received by the mobile terminal at a second time point, the second time point being a future time point after the first time point; and
- determining, according to a comparison of the first signal quality and the prediction of the second signal quality, a second service quality to be provided to the mobile terminal at the second time point;
- wherein, based on a result of the comparison of the first signal quality and the prediction of the second signal quality, the second service quality is set relative to the first service quality provided to the mobile terminal at the first time point; and
- wherein setting the second service quality includes:
- according to the first signal quality being higher than the prediction of the second signal quality, setting the second service quality to be lower than the first service quality provided to the mobile terminal at the first time point.

* * * * *